G. W. Keeler,
Shovel Plow,

N° 82,959.        Patented Oct. 13, 1868.

WITNESSES:
J. H. Burridge
E. E. Waite

INVENTOR:
G. Keeler.

United States Patent Office.

GEORGE W. KEELER, OF NEW HAVEN, OHIO.

Letters Patent No. 82,959, dated October 13, 1868.

IMPROVEMENT IN PLOWS.

The Schedule referred to in these Letters Patent and making part of the same.

*To all whom it may concern:*

Be it known that I, GEORGE W. KEELER, of New Haven, in the county of Huron, and State of Ohio, have invented certain new and useful Improvements in Plows; and I do hereby declare that the following is a full and complete description of the same, reference being had to the accompanying drawings, making part of this specification, in which—

Figure 1:
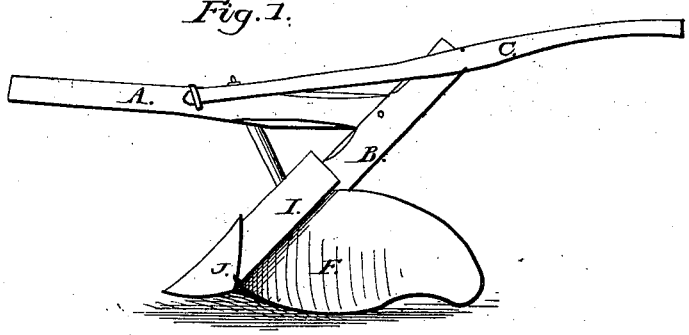
Figure 2:
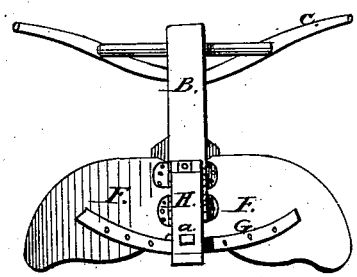
Figure 4:
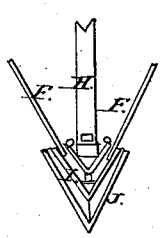
Figure 3:
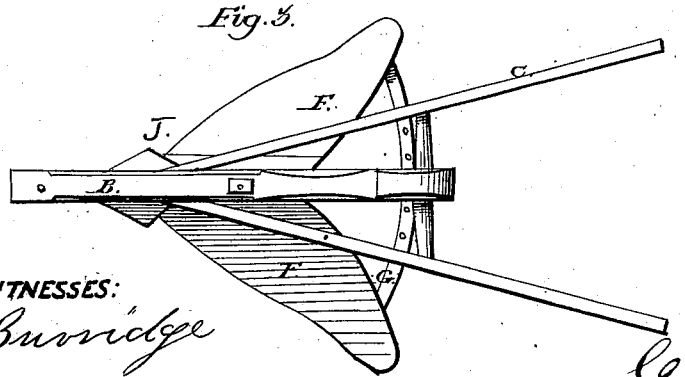

Figure 1 is a side view of the plow.
Figure 2, a view of the rear end.
Figure 3, a top view.
Figure 4, a detached section.

Like letters of reference refer to like parts in the different views presented.

A, fig. 1, represents the beam of the plow, B a standard, and C the handles by which it is held and directed.

To the standard is secured a metallic plate, D, fig. 4, and to which is hinged, by the butts E, wings or mould-boards F, and which are connected to each other by the adjusting-segments or braces G, and secured, when adjusted, by a pin, *a*, inserted in the holes of the braces and stay H, in and through which the ends of the braces slide.

I, fig. 1, is a plate conveying the articulation of the wings to the plate, thereby excluding the earth from the joint.

J is a point or shore, and is bolted or otherwise secured to the plate I.

K, fig. 1, is a stay or brace, whereby the beam and standard are firmly and strongly secured together.

The practical use of this plow is for the cultivation of corn, roots, &c., and for which it is admirably adapted, the peculiar shape of the wings being such as to throw the earth upon the hill, and which may be expanded or contracted, according to the width of the rows, by the wings being hinged to the standard, as above said.

This implement is light, strong, and durable, easy to handle, and can be so adjusted, by extending the wings, that two rows of corn may be treated at once, thereby economizing largely in time and labor.

What I claim as my improvement, and desire to secure by Letters Patent, is—

1. The wings F, when hinged to the plate D and standard B, so as to allow of their being contracted or expanded, in the manner as and for the purpose specified.

2. The plate I, as arranged in combination with the plate D and wings F, for the purpose set forth.

GEORGE W. KEELER.

Witnesses:
W. H. BURRIDGE,
E. E. WAITE.